United States Patent Office 3,395,173
Patented July 30, 1968

3,395,173
PROCESS FOR THE PRODUCTION OF ESTERS
Taijiro Oga, Michitoshi Kitabatake, Masashi Tanabe, Masatomo Ito, Noriyoshi Aozuka, and Takashi Ikeda, Tokyo, Japan, assignors to Showa Denko Kabushiki Kaisha, Minato-ku, Tokyo, Japan, a corporation of Japan
No Drawing. Filed Mar. 30, 1965, Ser. No. 444,075
Claims priority, application Japan, Apr. 6, 1964, 39/19,041
5 Claims. (Cl. 260—475)

ABSTRACT OF THE DISCLOSURE

A process for producing aromatic esters which comprises heating a mixture consisting of (1) an aromatic nitrile; (2) a polyhydric alcohol; (3) water; and (4) as a catalyst, a small amount of a lead compound selected from the group consisting of lead salts of aliphatic carboxylic acids, aromatic carboxylic acids and inorganic acids, lead halides and lead oxides at a temperature to effect said esterification in the range of 170° C.–280° C., and thereafter recovering the so-formed corresponding aromatic ester.

---

This invention relates to a method of catalytically reacting an organic nitrile with a polyhydric alcohol in the presence of a lead compound to prepare the corresponding carboxylic ester.

The method wherein a nitrile and an alcohol are reacted in the presence of a strong acid catalyst such as hydrochloric acid or sulfuric acid to yield a salt of imino ether and thereafter subjecting this to hydrolysis to prepare the corresponding ester or the method of preparing an ester directly by reacting a nitrile, alcohol and water concurrently in the presence of acidic catalyst or alkaline catalyst, such as a sodium alkoxide, or in the absence of any added catalyst has been known heretofore.

Of these prior art methods, that in which the reaction is carried out in the presence of a strong acid catalyst has such drawbacks in that not only is it necessary to use a great amount of catalyst such as of the order of at least one mole to one mole of the cyano group, but there is also considerable difficulty involved in separating the intended ester from the reaction product. In addition, the reactor must be one which is acid resistant and hence costly. On the other hand, in the method in which an alkaline catalyst is used, the time required for substantial completion of the reaction is considerably long, since the reaction velocity for conversion to the ester in the latter stages of the reaction shows a pronounced decline. Now, if in this case the reaction is discontinued at a stage in which the conversion ratio is still low to avoid the prolongation of the reaction over a long period of time, disadvantages will be encountered in that a troublesome treatment will be required for separating the unreacted substances.

The object of the present invention is to overcome these drawbacks of the prior art methods and to provide a method of preparing from an organic nitrile its corresponding carboxylic ester and/or polyester readily and efficiently by carrying out the reaction thereof promptly in the presence of a small amount of catalyst.

The foregoing object is achieved, in accordance with the present invention, by adding to the reaction system as catalyst at least one lead compound selected from the salts and oxides of lead and catalytically reacting an organic nitrile, polyhydric alcohol and water to form the corresponding organic carboxylic ester and/or polyester.

The use as catalyst of a lead compound for this type of reaction has not been known at all in the past. Further, the catalyst according to the present invention not only possesses a catalytic activity which far surpasses that of the conventional alkaline catalysts but also has many other merits. The features of the present catalyst and the advantages which accrue from its use will be more fully described hereinafter.

The lead compounds to be added as catalyst according to the present invention are the organic and inorganic acid salts and oxides of lead. Among the inorganic acid salts are also included those halides which are the lead salts of hydrohalogenic acids. Specific examples of these lead compounds include: the salts of aliphatic carboxylic acids, such as lead formate, acetate, propionate, butyrate, valerate, stearate, citrate, oxalate and malate; the salts of aromatic carboxylic acids, such as lead benzoate, salicylate and phthalate; the salts of inorganic acids, such as lead sulfate, nitrate, carbonate, borate, chromate, antimonate and ferrocyanide; the halides such as lead chloride and bromide; the oxides such as lead monoxide, dioxide, sesquioxide and basic oxide.

The lead compounds to be used in the method of this invention are, of course, not to be limited to those given hereinabove. For instance, taking the case of the lead salts, the class of said salts has no essential effect on its catalytic activity. Hence, the classes that can be employed extend to a broad range outside of those enumerated hereinbefore.

A primary feature of the lead compounds used as catalyst in the present invention is that they possess catalytic activity far surpassing that of the conventional alkaline catalysts. The following comparative experiment will fully illustrate this. Ten parts by weight of terephthalonitrile as the organic nitrile, 48.4 parts of ethylene glycol as the polyhydric alcohol and 3 parts by weight of water were placed in a reactor. The catalysts were added to this mixture at the ratio of $\frac{1}{80}$ mole per mole of the cyano group of said terephthalonitrile, and the reaction was carried out at a temperature of 180–190° C. The conversion rates measured at given timed intervals with the passage of the reaction time are tabulated below for the instance where the catalyst used was the conventional alkaline catalyst (sodium methoxide) and the instance where the catalyst used was the invention catalyst (lead acetate).

| Catalyst | Reaction Time | | |
|---|---|---|---|
| | 1 hr. | 5 hr. | 6 hr. |
| Sodium methoxide (conventional catalyst) | 31% | 60% | 70% |
| Lead acetate (invention catalyst) | 60% | 96% | 100% |

As is apparent from the foregoing table, the catalytic activity of the catalyst according to the present invention is markedly greater than that of the conventional alkaline catalysts. In other words, the reaction velocity obtained by the use of the alkaline catalysts is low and particularly since it declines as the latter stage of the reaction is approached, the reaction is either rendered difficult of completion or the time required therefor is unduly prolonged. On the other hand, the reaction velocity is very large when use is made of the catalyst according to this invention, and thus the conversion rate can be raised or the reaction can be completed in a short period of time. When the reaction extends over a prolonged period of time, not only is it a disadvantage from the commercial standpoint, but there is also the drawback that the degradation of the quality of the intended esters will be brought about. Hence, the effects of the present invention are great from these viewpoints also. This marked difference in the catalytic activity of these two catalysts is such as to make one presume that there must be a difference in their catalytic mechanism.

The second feature in connection with the use of the lead compounds as catalyst according to the invention resides in the point that the reaction can be carried out smoothly with the water, which is used as one of the reaction components along with the nitrile and alcohol, being present in the reaction system in its total quantity from the initial stage of the reaction. This is a very distinctive feature when compared with the prior art methods using the alkaline catalyst. In these prior art methods, since the reaction rate is very low when the water in its total required quantity is present in the reaction system from the initial stage, a troublesome procedure must be adopted of dividing the water into portions and feeding it incrementally in concomitance with the progress of the reaction. Moreover, there is also manifested the effect that when water is present in a sufficient amount from the initial stage, the side reaction wherein is produced as a by-product, for example, ethylene oxide by the dehydration of ethylene glycol is prevented. If ethylene oxide is formed, this oxide proceeds to react with the hereinafter-described ammonia which is evolved during the reaction to bring about the formation of undesirable by-products, such as ethanolamine. Further, in order to compensate for the decline in the reaction velocity in these prior art methods, it is also necessary to carry out such adjustments as causing the ammonia which evolves to be retained to a certain extent in the reaction system during the earlier stages of the reaction and eliminating this ammonia during the latter stages of the reaction. This retention of the ammonia in the reaction system becomes one of the causes of coloring the resulting esters. In contrast, according to the invention method, there is no need for such an adjustment, and the ammonia, which becomes the cause for the production of the by-product ethanolamine and the coloration of the ester, as hereinabove described, can be driven out of the reaction system as soon as it is evolved.

The catalyst according to this invention, besides possessing these aforementioned features and advantages, gives good results, though used in small amounts. Namely, the amount added of the lead compound ranges between $1/12{,}000$ and $1/20$ mole, and preferably $1/400$ and $1/80$ mole, per mole of the cyano group of the material organic nitrile.

We engaged in similar researches concerning the compounds of the various metals other than lead but found that the foregoing lead compounds were the best considering the fact that their catalytic activity was high and that they would yield ester products of good quality.

While all of the lead compounds used in this invention are good, they possess the following characteristics depending upon their constituent group.

For example, the salts of carboxylic acids are especially good with respect to reproductivity, because of their high solubility. In the case of the halides or ferrocyanide, the coloration of the resulting esters is slight. On the other hand, the oxides are characterized by the fact that the reaction velocity is accelerated remarkably when they are used.

We also engaged in studies in order to determine the manner in which these lead compounds were to be used. In consequence, we found that esters of much better grade and of very little coloration could be obtained when the esterification reaction was carried out in the following manner; namely, by adding the lead compound to an advance mixture of only the polyhydric alcohol and water of the reaction starting materials, heating this mixture for a short period of time, then mixing it with the organic nitrile, the other reaction starting material, and effecting the esterification reaction. Namely, when the lead compound is simply added to a reaction mixture consisting of the organic nitrile, polyhydric alcohol and water and the esterification reaction is carried out, a coloration of the reaction system is normally unavoidable. In contrast, when the reaction is carried out after first having given the lead compound the pretreatment as hereinabove described, the reaction system is hardly colored at all. As regards the effect of the pretreatment, while this will be illustrated in the hereinafter given examples, the following is one example.

When 10 parts by weight of terephthalonitrile as the organic nitrile, 48.4 parts by weight of ethylene glycol as the polyhydric alcohol and 3 parts by weight of water along with 0.7 part by weight of lead acetate as the catalyst were used and the reaction was carried out for 6 hours at a temperature of 185° C., the reaction mixture exhibited a tan color (9.1 YR 4.1/2.0 according to the Munsell notation system). On the other hand, when 48.4 parts by weight of ethylene glycol, 3 parts by weight of water and 0.7 part by weight of lead acetate were first heated for 1 hour at 150° C., then 10 parts by weight of terephthalonitrile were added, and the reaction was carried out for 6 hours at a temperature of 185° C., the conversion reached 100% and the reaction mixture exhibited a light yellow color (3.3 Y 8.5/2.4 according to the Munsell notation system). The diester obtained by filtration was recrystallized from water without the use of active carbon and pure white bis-(beta-hydroxyethyl)-terephthalate was obtained.

The heating temperature effective for the hereinbefore-described pretreatment is one ranging beween the reaction temperature of the subsequently carried out esterification reaction and a temperature about 50° C. therebelow. Further, a heating period of about 15 minutes to one hour will suffice. Heating at a higher temperature or for a longer period of time than indicated above will not bestow any particular benefits.

The pretreatment of the lead compound catalyst can be carried out by using the total amount of the polyhydric alcohol and water to be employed in the esterification reaction or by the use of a part thereof.

It is not yet fully clear as to what mechanism is responsible for the effect obtained by the pretreatment of the catalyst.

In all of the prior art methods of preparing esters from organic nitriles, polyhydric alcohols and water, the resulting reaction mixture was colored either brown or, in extreme cases, black. For purifying the esters separated from such a mixture, it was necessary to employ with great care such purifying means as recrystallization and fractional crystallization using a large amount of active carbon, or fractional distillation. In contrast, when, in accordance with the present invention, a lead compound catalyst is used, and particularly when it is used after having been pretreated with a polyhydric alcohol and water, the coloration of the resulting reaction mixture is very small. Hence, the ester separated therefrom is also of good quality. Even when the hereinabove-mentioned purifying means are employed for further purification of this ester, the use of active carbon is not necessarily required. Hence, the losses of the product by means of purification is exceedingly small and moreover the operation involved is simple.

The organic nitrile used as a starting material in the invention method is one containing at least one cyano group. Those utilizable include, e.g., benzonitrile, terephthalonitrile, isophthalonitrile, m- and p-toluinitrile, m- and p-nitrobenzonitrile, m- and p-chlorobenzonitrile, m- and p-cyanobenzoic ester and beta-naphthonitrile. Particularly good results are obtained by the use of benzonitrile, terephthalonitrile and isophthalonitrile.

As the polyhydric alcohol, one of the other starting materials in the invention method, the aliphatic diols and triols containing 2–4 carbon atoms can all be used. Particularly suitable are ethylene glycol, propylene glycol and glycerin. With respect to the amount used, these alcohols are preferably present normally in an amount in excess of the theoretical equivalent of the cyano group from the standpoint of economy and acceleration of the reaction. Particularly when the material nitrile is a solid, these alcohols also serve as a solvent. Hence, the amount used is, say, more than two times the equivalent; i.e., 2–50 moles, and preferably 5–15 moles, of the polyhydric alcohol are used per mole of the cyano group of the organic nitrile. The excess can, of course, be recovered and re-used after the reaction.

As still another reaction component, water is added to the reaction system. As previously stated, the total amount of the water to be used can be present in the reaction system from the initial stage. The amount used of the water is suitably 1 mole, the theoretical equivalent, to 2 moles, per mole of the cyano group contained in the organic nitrile. While normally 1–1.5 moles of water are used, most preferred is 1 mole.

Although it is possible to further the esterification reaction without adding water to the reaction system from the initial stage but by means of the water which separates from the material polyhydric alcohol, this is not desirable as an ester containing ether linkage in the molecule formed by the dehydration of said polyhydric alcohol is formed at the same time and also the rate of conversion of the nitrile remains at a low level. It is to be preferred that the formation of the regular type ester be promoted by the additional of water in at least a theoretical quantity.

Although the reaction can take place at below 150° C., a temperature on the order of 170°–280° C. is particularly to be preferred when consideration is given to such matters as shortening of the reaction time. This temperature is suitably chosen in consideration of such as the class of the material nitrile and polyhydric alcohol and the property of the resulting ester. Further, as previously noted, since a by-product is formed or the completion of the reaction is hindered, if the ammonia evolving during the reaction is retained in the system, the ammonia is preferably eliminated to the outside of the system as promptly as possible. For this purpose, a desirable mode of practice is that in which the ammonia is driven out by introducing into the reaction system an inert gas such as nitrogen. In this case, for replenishing the water that is lost at the same time by being entrained, the nitrogen to be introduced is preferably saturated in advance with water.

The reaction pressure to be used is decided suitably in consideration of such as the class of the nitrile and polyhydric alcohol used, the amount of water used and the reaction temperature. Usually, the reaction can generally be carried out satisfactorily at atmospheric pressure but, if necessary, it also may be carried out at pressures other than atmospheric.

The esters formed by the invention method can be obtained in good grade by such simple operations as, for example, filtration, washing and drying. In those instances where further purification is desired, the customary procedures such as the crystallization, fractional crystallization and fractional distillation techniques can be employed.

The esters obtained in accordance with the present invention are those corresponding to the starting material nitriles and polyhydric alcohols. For example, beta-hydroxyethylbenzoate is obtained from benzonitrile and ethylene glycol, bis(beta-hydroxyethyl) terephthalate is obtained from terephthalonitrile and ethylene glycol, and bis(beta-hydroxyethyl) isophthalate is obtained from isophthalonitrile and ethylene glycol. Further, when preparing, for example, the foregoing bis(beta-hydroxyethyl) terephthalate or bis(beta-hydroxyethyl) isophthalate, the resulting ester can be converted directly to the corresponding polyester, if desired, by heating the reaction mixture, after completion of the reaction, to a temperature elevated further by about 100° C., say 280° C., and eliminating ethylene glycol under reduced pressure.

For a clearer understanding of the present invention, the following examples are given. Unless otherwise noted, parts in the examples are by weight. Further, for indicating the extent to which the reaction mixture is colored, the degree of coloration of the reaction mixture at the time of the completion of the reaction was indicated by means of the Munsell notation system.

Example 1

In a 3-necked flask equipped with a magnetic stirrer, gas inlet, reflux condenser and thermometer were placed 6.4 parts of terephthalonitrile, 31 parts of ethylene glycol, 1.8 parts of water and 0.47 part of lead acetate $Pb(CH_3COO)_2 \cdot 3H_2O$. The air inside the flask was replaced with nitrogen, following which the flask was heated on an oil bath to an internal temperature of 185° C. while continuing the introduction and passage therethrough of the nitrogen.

The evolution of ammonia was observed, resulting from the reaction of the terephthalonitrile, ethylene glycol and water. This ammonia was conducted to the outside of the system along with the nitrogen via the reflux condenser and was caused to be absorbed into dilute sulfuric acid. Subsequently, the amount evolved of ammonia, i.e., the conversion of terephthalonitrile, was determined by back titration with a sodium hydroxide solution at prescribed time intervals.

Ammonia corresponding to 95% of theory was evolved 3 hours after the start of the reaction, and the total ammonia evolved reached the theoretical value after 6 hours.

This reaction mixture was then cooled to room temperature to precipitate a white solid (M.P. 100–106° C.), which was separated by filtration. When this filter cake was dissolved in hot water and, while using a small amount of active carbon, recrystallized three times therefrom followed by recrystallizing once from ethyl acetate, pure bis(beta-hydroxyethyl)terephthalate (BHT) (M.P. 110° C.) was obtained.

By heating this BHT at 280° C. under a high vacuum of 2 mm. Hg, a fiber-formable polyethylene terephthalate (M.P. 260° C.) having a good color tone was obtained.

Control

This experiment illustrates the instance in which no catalyst was used.

In a 3-necked flask equipped with a magnetic stirrer, gas inlet, reflux condenser and thermometer were placed 6.4 parts of terephthalonitrile, 31 parts of ethylene glycol and 1.8 parts of water. The air in the flask was replaced with nitrogen and the flask was then heated on an oil bath to an internal temperature of 185° C. while continuing the introduction and passage of the nitrogen through the flask.

Ammonia corresponding to 47% of theory was evolved 3 hours after the start of the reaction and after 6 hours the total ammonia evolved was 62% of theory.

Example 2

In a flask, as used in Example 1, were placed 6.4 parts of isopthalonitrile, 62 parts of ethylene glycol, 1.8 parts of water and 0.07 part of lead chloride ($PbCl_2$). The flask was then heated to an internal temperature of 180° C. while passing nitrogen therethrough.

The amount of ammonia evolved 3 hours after the start of the reaction was 72% of theory and after 6 hours was 86%.

This reaction mixture was cooled to room temperature and the precipitated white solid was separated by filtration. This solid was then dissolved in a hot water of about 80° C., the insoluble portion was filtered off, and thereafter the filtrate was cooled. The resulting crystals were removed and recrystallized from water three times, followed by recrystallization from petroleum ether-acetone to yield bis(beta-hydroxyethyl) isophthalate (M.P. 140–142° C.).

Example 3

In a flask, as used in Example 1, were placed 12.8 parts of terephthalonitrile, 114 parts of propylene glycol, 3.6 parts of water and 0.467 part of lead benzoate, $$Pb(OOC \cdot C_6H_5)_2 \cdot H_2O$$

and the reaction was carried out at 185° C. while passing nitrogen through the flask.

The amount of ammonia evolved 3 hours after the start of the reaction was 85% of theory, and after 6 hours, it was 98%.

After completion of the reaction, the excess propylene glycol was distilled off from the reaction mixture under reduced pressure, following which the viscous reaction product was heated while gradually raising the temperature and the degree of vacuum until in the final stages they reached to 280° C. and to 2 mm. Hg, respectively. The polycondensation reaction was carried out for 1 hour under these conditions.

Thus a polyester having a melting point of 122° C. was obtained.

Example 4

In a flask, as used in Example 1, were placed 10.3 parts of benzonitrile, 62 parts of ethylene glycol, 1.8 parts of water and 1.9 parts of lead acetate, $Pb(CH_3COO)_2 \cdot 3H_2O$. The flask was then heated to an internal temperature of 170° C. on an oil bath while passing nitrogen therethrough.

The amount of ammonia evolved 3 hours after the start of the reaction was 83% of theory and after 6 hours was 92%.

After distilling off from the reaction mixture under reduced pressure the excess ethylene glycol, the reaction mixture was subjected to vacuum distillation to yield beta-hydroxyethyl benzoate as a 100–104° C./0.5 mm. Hg fraction. When this compound was allowed to stand at room temperature, it solidified and crystallized, the melting point of resulting crystals being 42° C.

Examples 5–30

A flask, as used in Example 1, was employed, and reactions were carried out for 3 hours at 185° C. by adding to the mixtures consisting of the nitriles and polyhydric alcohols of columns II and III, respectively, of the following table and $1/10$ mole of water, the catalysts of column IV of said table in an amount of $1/4000$ mole. The amounts of ammonia evolved in these reactions are presented in column V of the table.

Example 32

In a 3-necked flask equipped with a magnetic stirrer, gas inlet, reflux condenser and thermometer were placed 93 parts of ethylene glycol, 2 parts of water and 0.48 part of lead acetate, $Pb(CH_3COO)_2 \cdot 3H_2O$. After replacing the air inside the flask with nitrogen, the flask was heated for 1 hour at an internal temperature of 150° C. while continuing the passage of the nitrogen therethrough. Subsequently, 6.4 parts of terephthalonitrile were added to this hot mixture, after which the heating of the mixture was carried out for 5 hours at an internal temperature of 195° C.

The amount of ammonia evolved attained a value of 98% of theory. The color tone of this reaction mixture was a very light brown (0.4 Y 7.4/2.9 according to the Munsell notation system). By way of comparison, when the reaction was carried out under the same conditions but without heat treating, as above, the catalyst before its use, the color tone of the reaction mixture was a yellowish brown (1.5 Y 6.7/8.6 according to the Munsell notation system).

Of the foregoing reaction mixtures the one wherein was used the pretreated catalyst was cooled to room temperature to precipitate crude BHT which was separated by suction filtration. After removing as much as possible of the adhering liquid from this crude BHT, it was dissolved in hot wtaer of about 80° C., following which it was recrystallized twice therefrom after filtering off the insoluble matter. Active carbon was not used in this instance. The resulting crystals were further recrystallized from ethyl acetate to yield pure BHT (M.P. 110° C.) of white color.

By heating this BHT at 280° C. under a high vacuum of 2 mm. Hg, white, fiber-formable polyethylene terephthalate having a melting point of 263° C. was obtained.

TABLE

| I | II | | III | | IV | V (percent) |
|---|---|---|---|---|---|---|
| 5 | TPN | 1/20 mole | EG | 1.5 mole | Lead propionate $Pb(C_2H_5COO)_2$ | 82 |
| 6 | TPN | do | EG | do | Lead butyrate $Pb(C_3H_7COO)_2$ | 80 |
| 7 | TPN | do | EG | do | Lead valerate $Pb(C_4H_9COO)_2$ | 77 |
| 8 | TPN | do | EG | do | Lead stearate $Pb(C_{17}H_{35}COO)_2$ | 79 |
| 9 | TPN | do | EG | do | Lead citrate $Pb_3(C_6H_5O_7)_2 \cdot 3H_2O$ | 83 |
| 10 | TPN | do | EG | 1.0 mole | Lead malate $Pb(C_4H_4O_5) \cdot 3H_2O$ | 83 |
| 11 | TPN | do | EG | do | Lead oxalate $PbC_2O_4$ | 85 |
| 12 | TPN | do | EG | do | Lead formate $Pb(CHO_2)_2$ | 86 |
| 13 | IPN | do | EG | do | Lead salicylate $Pb_2[C_6H_4(OH)COO] \cdot H_2O$ | 82 |
| 14 | TPN | do | PG | do | Lead phthalate $Pb[C_6H_4(COO)_2]$ | 88 |
| 15 | TPN | do | GL | do | Lead monoxide PbO | 87 |
| 16 | TPN | do | GL | do | Lead dioxide $PbO_2$ | 86 |
| 17 | TPN | do | GL | do | Lead sesquioxide $Pb_2O_3$ | 83 |
| 18 | IPN | do | EG | 1.5 mole | Lead basic oxide $Pb_3O(OH)_2$ | 79 |
| 19 | IPN | do | EG | do | Lead chloride $PbCl_2$ | 86 |
| 20 | IPN | do | EG | do | Lead bromide $PbBr_2$ | 82 |
| 21 | IPN | do | EG | do | Lead carbonate $[PbCO_3]_2Pb(OH)_2$ | 78 |
| 22 | IPN | do | EG | do | Lead chromate $PbCrO_4$ | 75 |
| 23 | IPN | do | EG | do | Lead antimonate $Pb(SbO)_2$ | 76 |
| 24 | TPN | do | EG | do | Lead monoxide PbO | 87 |
| 25 | TPN | do | EG | do | Lead dioxide $PbO_2$ | 84 |
| 26 | IPN | do | EG | do | Lead borate $Pb(BO_2)_2H_2O$ | 71 |
| 27 | TPN | do | EG | do | Lead basic oxide $Pb_3O(OH)_2$ | 85 |
| 28 | TPN | do | EG | do | Lead sesquioxide $Pb_2O_3$ | 82 |
| 29 | TPN | do | EG | do | Lead ferrocyanide $Pb_2[Fe(CN)_6] \cdot 3H_2O$ | 79 |
| 30 | TPN | do | EG | do | Lead nitrate $Pb(NO_3)_2$ | 78 |

I=Example No.; II=Nitrile material; III=Alcohol material; IV=Lead compound; V=Amount of ammonia evolved; TPN=Terephthalonitrile; IPN=Isophthalonitrile; EG=Ethylene glycol; PG=Propylene glycol; GL=Glycerin.

Example 31

In a flask, as used in Example 1, were placed 6.4 parts of terephthalonitrile, 46 parts of glycerin, 1.8 parts of water and 0.112 part of lead monoxide. The reaction was then carried out by heating the flask to an internal temperature of 200° C. on an oil bath while passing nitrogen therethrough. The amount of ammonia evolved 3 hours after the start of the reaction was 92% of theory and after 6 hours reached substantially the theoretical value.

By cooling this reaction mixture to room temperature and filtering the resulting precipitate, a white solid ester was obtained.

Example 33

Following the procedures described in Example 32, 0.28 part of lead monoxide was heat treated for 45 minutes at 150° C. in 93 parts of ethylene glycol and 2 parts of water. Thereafter, 6.4 parts of terephthalonitrile were added to this mixture and reacted for 5 hours at 175° C. The amount of ammonia evolved was 78% of theory. The color tone of this reaction mixture was light yellow (3.3 Y 8.5/2.4 according to the Munsell notation system).

For comparison, when the reaction was carried out under identical conditions except that the catalyst was used without being heat treated, the color tone of the reaction mixture was brown (9.7 YR 7.7/7.1 according to the Munsell notation system).

We claim:
1. A process for the production of aromatic esters which comprises heating a mixture consisting essentially of the following four components: (a) an aromatic nitrile containing 1-2 cyano groups; (b) a polyhydric alcohol selected from the group consisting of saturated aliphatic hydrocarbon diols and triols containing 2-4 carbon atoms; (c) water; and (d) as a catalyst, a lead compound selected from the group consisting of lead salts of aliphatic carboxylic acids selected from the group consisting of lead formate, lead acetate, lead propionate, lead butyrate, lead valerate, lead stearate, lead citrate, lead oxalate, and lead maleate; lead halides selected from the group consisting of lead chloride and lead bromide; lead salts of aromatic carboxylic acids selected from the group consisting of lead benzoate, lead salicylate, and lead phthalate; lead salts of inorganic acids selected from the group consisting of lead sulfate, nitrate, carbonate, borate, chromate, antimonate, and ferrocyanide; and lead oxides, said polyhydric alcohol (b) and water (c) used in the amounts of 2-50 moles and 1-2 moles, respectively, per mole of the cyano group contained in said aromatic nitrile (a), said lead compound (d) being used in an amount of $1/2000$–$1/20$ mole per mole of the cyano group contained in said aromatic nitrile (a), said heating temperature for effecting said esterification reaction being carried out in the range of from 170° C.–280° C. and thereafter recovering the so-formed corresponding aromatic ester.

2. The process according to claim 1 wherein is used a mixture comprising said aromatic nitrile component (a) and a component obtained by mixing in advance the three components consisting of said polyhydric alcohol (b), water (c) and lead compound (d), said second-named component being subjected to a pretreatment by heating for a short period of time at a temperature ranging between the esterification reaction temperature and a temperature about 50° C. therebelow.

3. The process according to claim 1 which comprises effecting said esterification reaction while passing through the reaction system a chemically inert gas saturated with water to expel the ammonia which evolves as a result of the reaction.

4. The process according to claim 1 wherein said aromatic nitrile (a) is selected from the group consisting of terephthalonitrile, benzonitrile and isophthalonitrile.

5. The process according to claim 1 wherein said polyhydric alcohol (b) is selected from the group consisting of ethylene glycol, propylene glycol, and glycerine.

References Cited

FOREIGN PATENTS 981,703  1/1965  Great Britain.

LORRAINE A. WEINBERGER, *Primary Examiner.*

T. L. GALLOWAY, *Assistant Examiner.*